United States Patent [19]

Kehr et al.

[11] 4,201,846

[45] May 6, 1980

[54] DIMENSIONALLY STABLE POLYURETHANE FOAM

[75] Inventors: Clifton L. Kehr, Silver Spring; Louis L. Wood, Rockville; Nelson S. Marans, Silver Spring; Glenn E. Fulmer, Clarksville, all of Md.

[73] Assignee: W. R. Grace & Co., New York, N.Y.

[21] Appl. No.: 963,600

[22] Filed: Nov. 24, 1978

Related U.S. Application Data

[63] Continuation-in-part of Ser. No. 854,600, Nov. 25, 1977, abandoned.

[51] Int. Cl.$^2$ ............................................. C08G 18/14
[52] U.S. Cl. ..................................... 521/137; 521/905
[58] Field of Search ................................ 521/137, 905

[56] References Cited

U.S. PATENT DOCUMENTS

| | | | |
|---|---|---|---|
| 3,781,231 | 12/1973 | Janssen | 521/137 |
| 3,793,241 | 2/1974 | Kyle | 521/159 |
| 3,846,508 | 11/1974 | Heinert | 260/859 R |

FOREIGN PATENT DOCUMENTS 1200322 3/1967 United Kingdom .
1429711 3/1976 United Kingdom .

*Primary Examiner*—Maurice J. Welsh
*Attorney, Agent, or Firm*—Richard P. Plunkett; William W. McDowell, Jr.

[57] ABSTRACT

The invention disclosed relates to hydrophilic polyurethane foam which exhibits improved tensile and tear properties and reduced shrinkage upon drying as a result of incorporation of substantially hydrophilic reinforcing fibers formed from homopolymers and copolymers of polyvinyl alcohol. The reinforced foams also exhibit reduced swelling upon contact with water.

19 Claims, No Drawings

DIMENSIONALLY STABLE POLYURETHANE FOAM

This application is a continuation-in-part of copending application having Ser. No. 854,600, filed Nov. 25, 1977, now abandoned.

BACKGROUND OF THE INVENTION

Polyvinyl compounds and chlorine containing polymers such as polyvinyl alcohol and polyvinyl chloride have been used in the prior art to impart improved fire retardancy, tensile strength, hydrophilicity, wettability and wickability to polyurethane foams.

Thus for example U.S. Pat. No. 3,846,508 teaches imparting flame retardant properties to a polyurethane foam by incorporation of trichloroethylene/vinyl-acetate copolymer.

In U.S. Pat. No. 3,214,375 an improvement in wicking properties is achieved by mixing polyvinyl alcohol with a wicking material.

U.S. Pat. No. 3,357,939 achieves improved physical properties by admixing polyvinyl chloride with a polyurethane prepolymer.

U.S. Pat. No. 3,046,172 describes sponges of good tensile strength and good elongation properties, said sponges being prepared by incorporation of hollow spheres into a copolymer of vinyl chloride and a vinyl acetate plastisol.

Regarding the effect of water-wetting, polyurethane foam sponges generally show characteristics which fall short of those exhibited by the natural cellulose sponges. In an effort to improve hydrophilicity, U.S. Pat. No. 2,900,278 describes a method of rendering polyurethane foam hydrophilic by impregnation with polyvinyl alcohol which may be insolubilized by treatment with formaldehyde and acid, e.g., sulfuric acid.

This invention relates to reinforced hydrophilic polyurethane foams. More particularly, the invention is concerned with hydrophilic polyurethane foams reinforced with fibers formed from homopolymers and copolymers of polyvinyl alcohol.

Present day foams, especially those used in a wet state such as household sponges, have a tendency to swell considerably when saturated with liquid. Additionally, when returned to the dry state, the foam ofttimes is distorted and in a shrunken condition. Furthermore, the foams, when wetted, are in a weakened condition resulting in tears and rips in the foam even under oridinary usage.

One object of the present invention is to produce a reinforced hydrophilic urethane foam having improved resistance to swelling when wet. Another object of the instant invention is to produce a reinforced hydrophilic urethane foam having improved wet tensile and tear strength. Other objects will become apparent from a reading hereinafter.

DESCRIPTION OF THE INVENTION

The present invention is a hydrophilic polyurethane foam comprising a poly(urea-urethane) foam matrix having an oxyalkylene backbone containing at least 40 mole percent oxyethylene. The foam matrix is reinforced by having substantially hydrophilic fibers formed from homopolymers and copolymers of polyvinyl alcohol distributed generally uniformly therein. The amount of such fibers employed is generally from about 1.0% to about 15% based on the weight of the foam matrix. If the amount of fibers employed exceeds about 15%, it is difficult to prepare the foams because of the high viscosities imparted to the various components by the fibers. If less than about 1% is employed, adequate reinforcing action is not obtained.

Use of the hydrophilic vinyl alcohol homopolymer and copolymer fiber as reinforcing agents in preparing the foams of the invention results in numerous advantages. Significantly, it has been found, as will be exemplified hereinafter, that the resulting foams are maintained in a hydrophilic state but are resistant to gross dimensional change on wetting and subsequent drying in comparison to non-reinforced foam. That is, the amount of swelling is reduced 40-60% without loss of water-absorption characteristics. This is especially important for various applications such as a household or industrial cleaning sponge. Of even greater importance is the strength reinforcing action that results from the use of the fibers of this invention. Most applications of hydrophilic urethane foams require the foam to be used while wet, a practice that leaves the water-swollen foam in a weakened condition. Surprisingly, the hydrophilic fibers interact with the hydrophilic urethane foam in such a way as to give the final sponge product a greatly enhanced wet tensile strength and wet tear strength when compared with the fiber-free control sponge. This is in striking contrast to what is found with the use of other commonly used reinforcing fibers such as chopped glass, rayon, nylon, cellulose and the like in hydrophilic urethane foam as will be shown hereinafter. In the latter cases, the wet tensile and wet tear strength of the resulting sponges are actually reduced below that of the unreinforced controls. Further, the vinyl alcohol homopolymer and copolymer fiber reinforced foams of the invention are superior in fire retardancy, i.e., flame spread resistance.

The term "foam matrix" as used herein designates the organic polyurethane foam matrix excluding the weight of any water or fibers included therein.

The polyvinyl alcohol-containing fibers employed herein as reinforcing agents have a denier of from about 0.1 to about 20 and a length of from about 1 to about 25 millimeters, preferably 1 to 15 mm.

As used herein, the term "polyvinyl alcohol copolymers" includes both co- and terpolymers containing at least 20 mole % of polyvinyl alcohol. The homopolymers and copolymers of polyvinyl alcohol used herein can be crosslinked, i.e., have a three-dimensional network structure.

The hydrophilic prepolymers and foams formed therefrom used herein are described in U.S. Ser. No. 805,458, filed June 10, 1977, now U.S. Pat. No. 4,137,200, issued Jan. 30, 1979 incorporated herein in its entirety by reference.

The reinforced hydrophilic foams are prepared by admixing a hydrophilic, isocyanate capped urethane-containing prepolymer with an aqueous reactant as described in U.S. Ser. No. 805,458. Prior to onset of the foaming reaction, the fibers are dispersed throughout the admixture. Admixture of the aqueous reactant and prepolymer results in a foaming reaction to yield the reinforced foams of the invention.

In preparing the foams the fibers are added to the aqueous reactant, e.g., water, and uniformly dispersed therein prior to admixture of the water with the prepolymer. Admixture of the fiber-containing aqueous reactant with the prepolymer results in generally uniform distribution of the fibers throughout the water/- prepolymer admixture. Addition of the fibers to the aqueous reactant prior to admixture with the prepolymer is preferred. An alternative procedure is to admix the fibers with the prepolymer. This procedure is less advantageous in that the fibers tend to thicken the prepolymer resulting in viscosities which make processing difficult. Additionally, the hydrophilic fibers may contain water which may also cause premature reaction with the NCO groups of the polymer, again contributing to undesirably high viscosities. Additionally, the fibers can be distributed throughout the water/prepolymer mixture after the admixture is formed, e.g., by spraying the fibers under pressure or pouring the fibers (without pressure other than needed to release the fibers from their container) over the surface of the prepolymer/aqueous phase admixture.

In preparing the foams the amount of water employed is at least 6.5 moles for each mole of NCO groups present in the prepolymer. Preferably, at least 25 moles of water are employed for each mole of NCO groups. A suitable range is from about 6.5 to about 390.

In adding the fibers directly to the water, it is preferred that a thickening agent be employed to increase the viscosity of the water/fiber dispersion. The increased viscosity tends to minimize settling out of the fibers. Preferably, a sufficient amount of the thickening agent is employed so that the viscosity of the water/fiber dispersion is at least 80% of that of the urethane prepolymer. It has been found that this "matching" of the viscosities of the aqueous and prepolymer phases is especially advantageous when the foams are prepared in automatic machinery. For example, customary practice is to place the fiber/water dispersion in one container with the prepolymer in a second container and meter measured amounts of these components through a mixing head followed by extrusion into a container or over a surface where foaming takes place. To promote mixing and reduce settling out, it is preferable that the viscosity of the two phases approach one another as described above.

Any of the commonly employed thickening agents for aqueous medium can be employed in the present invention, i.e., the type of thickening agent is not believed to be critical so long as it does not react to a great extent with any of the components of the system, especially the prepolymer. Fumed silicas (e.g., Cab-o-Sil silicas by Godfrey L. Cabot, Inc.) or other particulate, insoluble, non-fibrous thickeners are useful although use of these materials with automatic foam machines should be closely scrutinized to avoid pumping difficulties. Other suitable thickening agents include water-soluble polymers having a molecular weight of from about 50 000 to about 10,000,000 and employed at a rate of about 0.5-5% by weight of the water. Such materials are exemplified by the carboxymethylcellulose gums, hydroxyethylcellulose, high molecular weight polyoxyethylene or copolymers of polyoxyethylene with polyoxypropylene. Another suitable class of materials is the polyacrylamides having the above characteristics.

An example of the hydrophilic copolymer fibers employed in the present invention is described in U.S. Pat. No. 3,111,370 incorporated herein by reference. Generally, this patent describes preparation of fibers by emulsion of polyvinyl chloride in water. The polyvinyl chloride is at least partially grafted to the polyvinyl alcohol. Additionally polyvinyl alcohol is added into the emulsion so that the proportion of polyvinyl chloride to the total polymerized material is present is from about 50 to 80% by weight. Subsequently, the emulsion is spun through a spinning head, dried and oriented (e.g. by heat stretching). Some of the hydroxyl groups present may also be acetylated. The resulting fibers are then cut into suitable lengths for use in the present invention. Fibers useful in the present invention consist of polyvinyl chloride/polyvinyl alcohol copolymers containing 50-80 mole percent vinyl chloride units. Preferably the polyvinyl chloride/polyvinyl alcohol ratio is about 50/50.

The fibers are hydrophilic in the sense that they are water-wettable. The term "hydrophilic" as used in relation to the foam matrix is intended to means that the foam is water-wettable, and additionally the backbone segments thereof contain at least 40 mole percent oxyethylene.

Oxyalkylene Prepolymers

Polyether polyurethane prepolymers employed herein are hydrophilic, i.e., at least 40 mole % of the oxyalkylene units in the prepolymer backbone are oxyethylene units with the balance being oxypropylene, oxybutylene or other oxyalkylene units. In the resulting polyurethane foams, the branchpoints of the polymer chains are connected by essentially linear polyoxyalkylene chains containing at least 40 mole % of oxyethylene units (excluding initiators at branch-points) as described above. Preferably at least 75 mole % of oxyethylene units are employed.

As described above, the foams of the present invention are based on the prepolymer technique. Suitable prepolymers are prepared by capping a polyoxyalkylene polyol with an excess of polyisocyanate, e.g. toluene diisocyanate. Prior to capping, the polyol should have a molecular weight of from about 200 to about 20,000 and preferably from about 600 to about 6,000. The hydroxy functionality of the polyol and the corresponding isocyanate functionally following capping is from 2 to about 8. If foams are formed from prepolymers with an isocyanate functionality of about 2, the resulting foam is essentially linear and does not have as much tensile strength as crosslinked foams. Accordingly, if the isocyanate functionality is about 2, a crosslinker should be employed. Suitable crosslinkers are well-known in the polyurethane art and include by way of example tolylene-2,4,6-triamine, ethylene diamine, diethanolamine, diethylene triamine, triethylene-tetramine, tetraethylenepentamine, and ethanolamine.

Examples of suitable polyols (to be capped with polyisocyanates) include: (A) essentially linear polyols formed for example by reaction of ethylene oxide with ethylene glycol as an initiator. As discussed above, mixtures of ethylene oxide with other alkylene oxides can be employed so long as the mole percent of ethylene oxide is at least 40 percent. Also as stated, it may be desirable to use crosslinkers with these systems in which case the crosslinker can be included in the water along with the reinforcing fibers into which the prepolymer is dispersed. Where the linear polyethers are mixtures of ethylene oxide with, e.g., propylene oxide, the polymer can be either random or a block copolymer and the terminal units can be either oxyethylene or oxypropylene. A second class of polyol (B) includes those with a hydroxy functionality of 3 or more. Such polyols are commonly formed by reacting alkylene oxides with a polyfunctional initiator such as trimethylolpropane, pentaerythritol, etc. In forming the polyol B, the alkylene oxide used can be ethylene oxide or mixtures of ethylene oxide with other alkylene oxides as described above. Useful polyols can be further exemplified by (C), a mixture of linear and branched polyfunctional polyols as exemplified in A and B above together with an initiator or crosslinker. This crosslinker may itself be an isocyanate, e.g., the reaction product of TDI or a similar polyisocyanate with a monomeric polyol (e.g., TMOP, glycerol, pentaerythritol) containing 3 or 4—OH groups. A specific example of C is a mixture of polyethylene glycol (m. w. about 1,000) with trimethylolpropane, trimethylolethane or glycerine. This mixture can be subsequently reacted with excess polyisocyanate to provide a prepolymer useful in the invention. Alternatively, the linear (e.g., polyethylene glycol) or branched polyols can be reacted separately with excess polyisocyanate. The initiator, e.g., trimethylolpropane (TMOP), can also be separately reacted with polyisocyanate. Subsequently, the two capped materials can be combined to form the prepolymer.

Thus, by using a hydrophilic prepolymer as taught in U.S. Ser. No. 805,458, a crosslinked hydrophilic foam having a three-dimensional network is formed from the reaction product of A. isocyanate capped prepolymers consisting of a mixture of (1) an isocyanate capped hydrophilic polyoxyethylene diol, said diol having an ethylene oxide content of at least 40 mole percent; and (2) an isocyanate capped polyol having a hydroxyl functionally in the range 3 to 8 prior to capping; said isocyanate capped polyol being present in an amount in the range 2.9 to 50% by weight of (1) and (2); B. 0.5 to 10 % by weight and A and B of a polyisocyanate having an isocyante functionality in the range 2.0 to 3.0; and C. 6.5 to 390 moles of water for each mole of unreacted isocyanate.

The process of forming said crosslinked hydrophilic urethane foam comprises admixing a hydrophilic polyoxyethylene diol having an ethylene oxide content of at least 40 mole percent with a polyol having a hydroxyl functionally in the range 3 to 8, said polyol being present in the admixture in an amount in the range 1.0 to 20% by weight, reacting with the admixture at a temperature in the range 0° to 120° C. an amount of a polyisocyanate having an isocyanate functionality in the range 2.0 to 3.0 equal to 1.8 to 1.9 to OH equivalents for a time sufficient to cap substantially all the hydroxyl groups of the admixture, adding additional polyisocyanate having an isocyanate functionality in the range 2.0 to 3.0 to provide 0.1 to 0.3 equivalents of NCO per initial equivalent of OH in excess of the theoretical amount necessary to react with the hydroxyl groups and thereafter adding 6.9 to 390 moles of water for each mole of unreacted isocyanate in the admixture.

Suitable polyisocyanates useful in preparing prepolymers include toluene-2,4-diisocyanate, toluene-2,6-diisocyanate, commercial mixtures of toluene2,4- and 2,6-diisocyanates, ethylene diisocyanate, ethylidene diisocyanate, propylene-1,2-diisocyanate, cyclohexylene-1,2-diisocyanate, cyclohexylene-1,4-diisocyanate, m-phenylene diisocyanate, 3,3'-diphenyl-4,4'-biphenylene diisocyanate, 4,4'-biphenylene diisocyanate, 3,3'-dichloro-4,4'-biphenylene diisocyanate, 1,6-hexamethylene diisocyanate, 1,4-tetramethylene diisocyanate, 1,10-decamethylene diisocyanate, 1,5-naphthalenediisocyanate, cumene-2,4-diisocyanate, 4-methoxy-1,3-phenylenediisocyanate, 4-chloro-1,3-phenylenediisocyanate, 4-bromo-1,3-phenylenediisocyanate, 4-ethoxy-1,3-phenylenediisocyanate, 2,4'-diisocyanatodiphenylether, 5,6-dimethyl-1,3-phenylenediisocyanate, 2,4-dimethyl-1,3-phenylenediisocyanate, 4,4'-diisocyanatodiphenylether, benzidinediisocyanate, 4,6-dimethyl-1,3-phenylenediisocyanate, 9,10-anthracenediisocyanate, 4,4'-diisocyanatodibenzyl, 3,3'-dimethyl-4,4'-diisocyanatodiphenylmethane, 2,6-dimethyl-4,4'-diisocyanatodiphenyl, 2,4-diisocyanatostilbene, 3,3'-dimethyl-4,4'-diisocyanatodiphenyl, 3,3'-dimethoxy-4,4'-diisocyanatodiphenyl, 1,4-anthracenediisocyanate, 2,5-fluorenediisocyanate, 1,8-naphthalenediisocyanate, 2,6-diisocyanatobenzfuran, 2,4,6-toluenetriisocyanate, and p,p',p"-triphenylmethane triisocyanate.

Suitable initiators useful in preparing prepolymers include propylene glycol, trimethylene glycol, 1,2-butylene glycol, 1,3-butanediol, 1,4-butanediol, 1,5-pentanediol, 1,2-hexylene glycol, 1,10-decanediol, 1,2-cyclohexanediol, 2-butene-1,4-diol, 3-cyclohexene-1,1-dimethanol, 4-methyl-3-cyclohexene-1,1-dimethanol, 3-methylene-1,5-pentanediol, diethylene glycol, 1,2,6-hexanetriol, 1,1,1-trimethylolpropane, 3-(2-hydroxyethoxy)-1,2-propanediol, 3-(2-hydroxypropoxy)-1,2-propanediol, 2,4-dimethyl-2-(2-hydroxyethoxy)-methylpentanediol-1,5, 1,1,1-tris[(2-hydroxyethoxy)-methyl]ethane, 1,1,1-tris[(2-hydroxypropoxy)methyl]-propane, triethanolamine, triisopropanolamine, resorcinol, pyroqallol, phloroglucinol, hydroquinone, 4,6-ditertiarybutyl catechol, catechol, ethylene diamine and propylene diamine.

The following examples will aid in explaining, but expressly not limit, the instant invention. Unless otherwise noted, all parts and percentages are by weight.

EXAMPLE 1

Preparation of Prepolymer A

A hydrophilic isocyanate capped, urethane-containing prepolymer was prepared by admixing 2 molar equivalents of polyethylene glycol having an average molecular weight of 1,000 (PEG—1,000) and one molar equivalent of trimethylolpropane (TMOP). The admixture was dried at 100°-110° C. under a pressure of 5-15 Torr to remove water. The resulting dried mixture was slowly added over a period of about one hour to a vessel containing 6.65 molar equivalents of toluene diisocyanate (TDI) while stirring the TDI and polyol mixture and maintaining the temperature at 60° C. The reaction was continued at 60° C. with stirring for three additional hours. Then an additional 1.05 molar equivalent of TDI was added with stirring over a period of about one hour while maintaining the temperature at 60° C. The final reaction mixture contained a 10% molar excess of TDI. All hydroxyl groups were capped with isocyanate and some chain extension occurred between the polyols and TDI. The resultant prepolymer mixture will hereinafter be referred to as Prepolymer A.

EXAMPLE 2

A prepolymer was prepared as in Example 1 with the exception that 0.66 molar equivalents of TMOP were employed for every 2 molar equivalents of PEG—1,000. In the initial capping reaction with TDI, the amount of TDI employed was about 92% of that theoretically required to cap all hydroxyl groups in the polyol mixture. Subsequently, an additional 13% TDI was added to provide a theoretical molar excess of about 5%. All hydroxyl groups were capped with isocyanate and some chain extension occurred between the polyols and TDI. The resultant prepolymer mixtures will hereinafter be referred to as Prepolymer B.

EXAMPLE 3

Polyurethan Foam Preparation 100 parts of Prepolymer A from Example 1 were admixed with 100 parts of water containing 2.0 parts of Wyandotte Pluronic L-62 as a surfactant. The mixture was stirred and allowed to foam. The resultant non-reinforced, hydrophilic foam used as a control is hereinafter referred to as Foam "A".

EXAMPLE 4

100 parts of Prepolymer B from Example 2 were admixed with 100 parts of water containing 4.0 parts Wyandotte Pluronic L-62, as a surfactant. The mixture was stirred and allowed to foam. The resultant non-reinforced, hydrophilic foam used as a control will be referred to hereafter as Foam "B".

EXAMPLE 5

Fiber-filled Polyurethane Foam

Polyurethane foam samples were prepared from the reactants in Example 3. The first foam (designated "B-I") contained 6.3 parts of vinyl alcohol/vinyl chloride copolymer fibers (CORDELAN, a 50/50 vinyl alcohol/vinyl chloride copolymer, commercially available from Amerimex Corp.) per 100 parts by weight of the prepolymer. A second foam designated as "B-II" contained 10 parts of copolymer fibers per 100 parts of the prepolymer. The copolymer fibers were about 2 denier with an average length of about 1.5 mm and were incorporated into the surfactant-containing aqueous phase. The aqueous phase was used to prepare a foam as in Example 3 above.

EXAMPLE 6

Samples A, B-I, and B-II were dried under the same conditions, i.e., at 60° C., 150–400 Torr for about 16 hours and the physical characteristics observed in the dried foams were as listed in Table I below.

TABLE I

| Foam | Pts. of Fibers per 100 pts. Prepolymer | Density | Vol. Shrinkage % | Wet-In Time, Sec. | Water Absorption % Vol. Increase |
|---|---|---|---|---|---|
| A | 0.0 | 5.4 | 45 | 4.5 | 88 |
| B-I | 6.3 | 4.9 | 26 | 1.0 | 39 |
| B-II | 10.0 | 5.4 | 26 | 1.0 | 41 |

As evidenced by the data in TABLE I, volume shrinkage in the fiber-containing foams was greatly reduced in comparison with Sample A (the foam of Example 3) which did not contain the fibers, i.e., the dried foams exhibited much better dimensional stability upon drying. Also swelling due to water absorption was also greatly reduced.

As illustrated in the following table, improved wet and dry tensile properties were also observed for the fiber-containing foams.

TABLE II

| | Dry Properties | | | | Wet Properties | | | |
|---|---|---|---|---|---|---|---|---|
| Samples | Modulus (psi) | Tensile (psi) | Elongation to Failure % | Tear Strength pli | Modulus (psi) | Tensile (psi) | Elongation to Failure % | Tear Strength |
| A | 28 | 19 | 160 | 2.4 | 11 | 10 | 142 | 0.7 |
| B-I | 51 | 21 | 64 | 2.5 | 36 | 12 | 57 | 1.0 |
| B-II | 58 | 25 | 59 | 3.4 | 40 | 18 | 56 | 1.1 |

EXAMPLE 7

Using the reactants of Example 4, 10 parts of a crosslinked polyvinyl alcohol homopolymer fiber of varying denier and length were added to the water phase and foaming was accomplished as in Example 4. The tensile and tear properties of the reinforced foams were measured against a control foam without any reinforcing agent. The results are shown in TABLE III.

TABLE III

| | | | | Foam Density (lbs ft³) | Tensile Properties[7] | | | | | | | |
|---|---|---|---|---|---|---|---|---|---|---|---|---|
| | | | | | Dry | | | Wet | | | Tear Strength | |
| Ex. No. | Heated[1] | Foam[2] | Fiber (parts)[3] | | Modulus (psi) | Tensile (psi) | Elongation to fail, % | Modulus (psi) | Tensile (psi) | Elongation to fail, % | Dry lbs/inch | Wet lbs/inch |
| 7(a) | No | B | None | 7.44 | 13 ± 0.9 | 33 ± 0.6 | 478 ± 26 | 11 ± 0.9 | 11 ± 0.2 | 134 ± 12 | 3.76 ± .04 | 0.69 ± .03 |
| 7(b) | No | B | 10[4] | 5.40 | 151 ± 67 | 62 ± 29 | 58 ± 7 | 93 ± 30 | 23 ± 3.8 | 41 ±10.8 | 4.85 ± 0.35 | 1.92 ± 0.04 |
| 7(c) | Yes | B | None | 7.0 | 14 ± 0.6 | 37 ± 1 | 436 ± 22 | 10 ± 1.2 | 14 ± 0.1 | 200 ± 26 | 4.4 ± 0.1 | 1.29 ± 0.31 |
| 7(d) | Yes | B | 10[5] | 6.4 | 88 ± 20 | 41 ± 9 | 64 ± 4 | 59 ± 26 | 24 ± 9 | 52 ± 14 | 4.9 ± 0.1 | 2.87 ± 0.08 |
| 7(e) | No | B | None | 8.1 | 13 ± 0.9 | 39 ± 3.2 | 476 ± 19 | 10 ± 1.1 | 13 ± 0.3 | 176 ± 12 | 4.1 ± 0.2 | 0.74 ± 0.07 |
| 7(f) | No | B | 10[6] | 6.6 | 46 ± 11 | 34 ± 5 | 98 ± 20 | 25 ± 9.2 | 14 ± 4.0 | 82 ± 6.6 | 6.1 ± 0.6 | 1.62 ± 0.32 |

[1]The prepolymer was heated at 65° C. for 16 hrs. and then cooled to room temperature before being foamed.
[2]Foam from Example 4.
[3]Crosslinked polyvinyl alcohol homopolymer fiber commercially available under the tradename "Kuralon" from Kuraray International.
[4]Crosslinked PVA fibers were 3 mm in length and 1 denier.
[5]Crosslinked PVA fibers were 6mm in length and 2 denier.
[6]Crosslinked PVA fibers were 12 mm in length and 5 denier.
[7]Property values are based on three samples.

As can be seen from the results, the addition of the crosslinked polyvinyl alcohol reinforcing agent improved both the wet and dry tensile properties such as modulus and tensile as well as the tear properties.

EXAMPLE 8

Preparation of Prepolymer C

A hydrophilic isocyanate capped, urethane-containing prepolymer was prepared by admixing 2 molar equivalents of polyethylene glycol having an average molecular weight of 600 (PEG—600) and one molar equivalent of trimethylolpropane (TMOP). The admixture was dried at 100°–110° C. under a pressure of 5–15 Torr to remove water. The resulting dried mixture was slowly added over a period of about one hour to a vessel containing 6.65 molar equivalents of toluene diisocyanate (TDI) while stirring the TDI and polyol mixture and maintaining the temperature at 60° C. The reaction was continued at 60° C. with stirring for three additional hours. Then an additional 1.05 molar equivalent of TDI was added with stirring over a period of about one hour while maintaining the temperature at 60° C. The final reaction mixture contained 10% molar excess of TDI. All hydroxyl groups were capped with isocyanate and some chain extension occurred between the polyols and TDI. The resultant prepolymer mixture will hereinafter be referred to as Prepolymer C.

The following example shows that not all fibers improve the dry and wet tensile and tear properties of a foam.

EXAMPLE 9

Using a Plackett Burman statistical analysis, several foams were made to analyze the effect of various additives. In all examples the additives were added to the water reactant except the Prepolymer C additive which was added to Prepolymer A. The prepolymer and water reactants were admixed with stirring and allowed to foam. The resultant foams were microwave dried, vacuum oven dried and then air dried for 2 days. TABLE IV shows the various amounts of additives added to the foams and TABLE V shows the resulting tensile and tear properties. In TABLE V, sample 9h, which did not contain fibers, had the highest values for wet and dry tensile and tear strengths of any of the foams.

The analysis of the results of the effect of the various additives by the standard Plackett-Burman procedure is given in TABLE VI. The analysis is performed by adding the single physical property values for the four samples containing the additive and determining the average value (by dividing by 4) and adding the single physical property values for the four samples not containing the additive and determining the average value (by dividing by 4). All of the four fibers gave poorer dry and wet tear and tensile strengths than without the fibers present according to the Plackett-Burman analysis.

TABLE IV

| Example No. | Prepolymer A (parts) | H$_2$O (parts) | Chopped Glass[1] (parts) | Rayon[2] (parts) | Nylon[3] (parts) | Solka Floc[4] | Prepolymer C (parts) | B-26[5] (parts) | L-520[6] |
|---|---|---|---|---|---|---|---|---|---|
| 9(a) | 100 | 200 | 20 | 10 | 10 | | 20 | | |
| 9(b) | 100 | 200 | | 10 | 10 | 10 | | 3.0 | |
| 9(c) | 100 | 100 | | | 10 | 10 | 20 | | 1.0 |
| 9(d) | 100 | 100 | 20 | | | 10 | 20 | 3.0 | |
| 9(e) | 100 | 100 | | 10 | | | 20 | 3.0 | 1.0 |
| 9(f) | 100 | 100 | 20 | | 10 | | | 3.0 | 1.0 |
| 9(g) | 100 | 200 | 20 | 10 | | 10 | | | 1.0 |
| 9(h) | 100 | 100 | | | | | | | |

[1]Chopped fiberglass 1/32".
[2]Rayon 0.15 denier.
[3]Nylon 3.0 denier.
[4]Solka Floc - a beaten cellulose fiber commercially available from Brown C0.
[5]B-26 - a surfactant commercially available from BASF-Wyandotte.
[6]L-520 - a surfactant commerically available from Union Carbide.

TABLE V

| | Tensile and Tear Strength (Horizontal) | | | | | | | |
|---|---|---|---|---|---|---|---|---|
| | Tensile Properties (Dry) | | | | Tensile Properties (Wet) | | | |
| Example No. | Modulus (psi) | Tensile (psi) | Elongation to Fail % | Tear Strength (lbs/in) | Modulus (psi) | Tensile (psi) | Elongation to Fail % | Tear Strength (lbs/in) |
| 9(a) | 37.4 ± 4.0 | 12.6 ± 1.5 | 63 ± 6 | 1.88 ± 0.09 | 13.0 ± 2.1 | 5.0 ± 0.2 | 49 ± 6 | 0.66 ± 0.07 |
| 9(b) | 7.4 ± 1.7 | 4.5 ± 0.6 | 96 ± 14 | 1.76 ± 0.11 | 3.5 ± 0.6 | 2.2 ± 0.3 | 79 ± 8 | 0.38 ± 0.03 |
| 9(c) | 40.0 ± 0.8 | 13.9 ± 0.6 | 77 ± 4 | 1.54 ± 0.03 | 14.8 ± 0.3 | 6.2 ± 0.5 | 68 ± 6 | 0.64 ± 0.03 |
| 9(d) | 13.8 ± 2.4 | 6.6 ± 0.6 | 79 ± 16 | 2.51 ± 0.36 | 6.5 ± 0.5 | 3.8 ± 0.8 | 66 ± 9 | 0.65 ± 0.14 |
| 9(e) | 20.8 ± 3.5 | 9.8 ± 1.7 | 100 ± 17 | 1.66 ± 0.06 | 7.4 ± 0.0 | 5.3 ± 0.4 | 76 ± 3 | 0.55 ± 0.02 |
| 9(f) | 35.1 ± 4.9 | 14.1 ± 0.8 | 116 ± 15 | 2.90 ± 0.15 | 11.2 ± 0.4 | 6.1 ± 0.5 | 75 ± 11 | 0.66 ± 0.04 |
| 9(g) | 67.1 ± 11.5 | 18.0 ± 0.4 | 81 ± 13 | 2.02 ± 0.12 | 17.7 ± 0.9 | 6.9 ± 0.2 | 61 ± 3 | 0.64 ± 0.02 |
| 9(h) | 65 ± 8.0 | 38.5 ± 2.5 | 158 ± 15 | 6.29 ± 0.09 | 24.3 ± 0.6 | 14.5 ± 0.6 | 83 ± 2 | 1.8 ± 0.4 |

TABLE VI

| | Plackett-Burman Matrix for TABLES IV and V | | | | | | | |
|---|---|---|---|---|---|---|---|---|
| | Chopped Glass | | Rayon | | Nylon | | Solkafloc | |
| Dry | 30 parts | 0 | 15 parts | 0 | 15 parts | 0 | 15 parts | 0 |
| Modulus (psi) | 38.4 ± 14.4 | 33.3 ± 19.2 | 33.2 ± 19.1 | 38.5 ± 14.1 | 30.0 ± 19.5 | 41.7 ± 24.5 | 32.1 ± 20.2 | 39.6 ± 12.8 |
| Tensile (psi) | 12.8 ± 3.2 | 16.7 ± 10.4 | 11.2 ± 4.1 | 18.1 ± 10.5 | 11.3 ± 3.4 | 18.2 ± 10.1 | 10.8 ± 5.2 | 18.8 ± 9.4 |
| Elongation to Fail % | 85 ± 16 | 108 ± 25 | 85 ± 13 | 108 ± 30 | 88 ± 18 | 105 ± 27 | 83 ± 16 | 109 ± 28 |
| Tear (lbs/in) | 2.34 ± 0.38 | 2.81 ± 1.72 | 1.83 ± 0.12 | 3.31 ± 1.49 | 2.02 ± 0.44 | 3.12 ± 1.59 | 1.96 ± 0.31 | 3.18 ± 1.55 |
| Wet | | | | | | | | |
| Modulus (psi) | 12.1 ± 3.2 | 12.5 ± 7.0 | 10.4 ± 4.4 | 14.2 ± 5.4 | 10.6 ± 3.6 | 14.0 ± 7.0 | 10.6 ± 6.6 | 14.0 ± 5.2 |
| Tensile (psi) | 5.5 ± 1.0 | 7.0 ± 3.7 | 4.8 ± 1.3 | 7.6 ± 3.4 | 4.9 ± 1.3 | 7.6 ± 3.4 | 4.8 ± 1.8 | 7.7 ± 4.4 |
| Elongation | | | | | | | | |

TABLE VI-continued

| | Plackett-Burman Matrix for TABLES IV and V | | | | | | | |
|---|---|---|---|---|---|---|---|---|
| | Chopped Glass | | Rayon | | Nylon | | Solkafloc | |
| Dry | 30 parts | 0 | 15 parts | 0 | 15 parts | 0 | 15 parts | 0 |
| to Fail % | 63 ± 8 | 77 ± 5 | 66 ± 14 | 73 ± 3 | 68 ± 9 | 72 ± 8 | 69 ± 5 | 71 ± 11 |
| Tear (lbs/in) | 0.66 ± 0.01 | 0.84 ± 0.47 | 0.56 ± 0.09 | 0.94 ± 0.43 | 0.59 ± 0.10 | 0.91 ± 0.45 | 0.58 ± 0.10 | 0.92 ± 0.59 |

Aside from the polyvinyl alcohol homopolymer fibers used herein, fibers of copolymers and terpolymers containing at least 20 mole % of polyvinyl alcohol are operable as reinforcing agents. The copolymers of vinyl alcohol can contain hydrophobic monomers such as ethylene, vinyl chloride, vinylidene chloride, acrylonitrile, stryene, alkyl acrylates and the like. Hydrophilic monomers that can be used to form the PVA copolymer include vinyl pyridine, vinyl pyrrolidone, acrylamide, acrylic acid, methacrylic acid and the like. Terpolymer combinations may contain mixtures of the above monomers.

The reinforcing fibers can be crosslinked or not as desired. Standard crosslinking procedures can be used in forming these fibers and include coupling of the hydroxyl groups on adjacent molecules by reactions such as esterification or the use of tetrafunctional monomers in the preparation of the copolymer and terpolymer systems such as ethylene glycol dimethacrylate.

We claim:

1. A reinforced, hydrophilic polyurethane foam comprising a poly(urea-urethane) foam matrix having an oxyalkylene backbone containing at least 40 mole percent oxyethylene, said foam matrix having uniformly distributed therein 1.0 to 15% by weight of the foam matrix of substantially hydrophilic, reinforcing fibers selected from the group consisting of polyvinyl alcohol homopolymer and copolymers of polyvinyl alcohol, and polyvinyl chloride.

2. The foam of claim 1 wherein the fibers are hydrophilic, crosslinked polyvinyl alcohol homopolymer fibers.

3. A foam as in claim 1 wherein the fibers are hydrophilic polyvinyl chloride/polyvinyl alcohol copolymer fibers.

4. A polyurethane foam as in claim 1 wherein the fibers are from about 0.1 to about 20 denier.

5. A polyurethane foam as in claim 3 wherein the copolymer fibers contain at least 50 mole percent of polymerized vinyl alcohol.

6. A polyurethane foam as in claim 1 wherein the oxyalkylene backbone of the foam matrix contains at least 75 mole percent oxyethylene.

7. A method of preparing a fiber-reinforced polyurethane foam comprising admixing a hydrophilic urethane prepolymer with water to form a foam matrix, said prepolymer having an oxyalkylene backbone containing at least 40 mole percent oxyethylene, said admixture having uniformly distributed therein 1.0 to 15% by weight of the foam matrix of substantially hydrophilic, reinforcing fibers selected from the group consisting of polyvinyl alcohol homopolymer and copolymers of polyvinyl alcohol and polyvinyl chloride.

8. The method of claim 7 wherein the fibers are hydrophilic, crosslinked polyvinyl alcohol homopolymer fibers.

9. The method of claim 7 wherein the fibers are hydrophilic polyvinyl chloride/polyvinyl alcohol copolymer fibers.

10. The method of claim 7 wherein the fibers have a denier of from about 0.1 to about 20.

11. The method of claim 7 wherein the fibers are added to the water prior to admixture with the prepolymer.

12. The method of claim 11 wherein uniform dispersion of the fibers in the water is promoted by 0.5 to 5.0% by weight of the water of a thickening agent being added thereto.

13. A method as in claim 12 wherein the thickening agent is a high molecular weight water-soluble polymer.

14. A reinforced, crosslinked hydriphilic foam comprising a poly(urea-urethane) foam matrix having a three-dimensional network comprising the reaction product of
A. isocyanate capped prepolymers consisting of a mixture of
   (1) an isocyanate capped hydrophilic polyoxyethylene diol, said diol having an ethylene oxide content of at least 40 mole percent; and
   (2) an isocyanate capped polyol having a hydroxyl functionality in the range 3 to 8 prior to capping; said isocyanate capped polyol being present in an amount in the range 2.9 to 50% by weight of (1) and (2);
B. 0.5 to 10.0% by weight of A and B of a polyisocyanate having an isocyanate functionality in the range 2.0 to 3.0; and
C. 6.5 to 390 moles of water for each mole of unreacted isocyanate, said matrix having uniformly distributed therein 1.0 to 15% by weight of the foam matrix of substantially hydrophilic reinforcing fibers selected from the group consisting of homopolymer and copolymers of polyvinyl alcohol.

15. The foam of claim 14 wherein the fibers are hydrophilic, crosslinked polyvinyl alcohol homopolymer fibers.

16. A foam as in claim 14 wherein the fibers are hydrophilic polyvinyl chloride/polyvinyl alcohol copolymer fibers.

17. A polyurethane foam as in claim 14 wherein the fibers are from about 0.1 to about 20 denier.

18. A polyurethane foam as in claim 16 wherein the copolymer fibers contain at least 50 mole percent of polymerized vinyl alcohol.

19. A polyurethane foam as in claim 14 wherein the oxyalkylene backbone of the foam matrix contains at least 75 mole percent oxyethylene.

* * * * *